(12) United States Patent
Ryu et al.

(10) Patent No.: US 7,591,635 B2
(45) Date of Patent: Sep. 22, 2009

(54) WIND TURBINE

(76) Inventors: Byung-Sue Ryu, 2-601 Mi-Joo Apt., 547-1 Seong-nae Dong, Kang-dong Gu, Seoul 134-030 (KR); Young-Sil Yu, 108-1503 Dogok Samsung Remian Apt., Dogok 2-Dong, Gangnam-Ku, Seoul 135-537 (KR)

( * ) Notice: Subject to any disclaimer, the term of this patent is extended or adjusted under 35 U.S.C. 154(b) by 380 days.

(21) Appl. No.: 10/579,572

(22) PCT Filed: Dec. 6, 2005

(86) PCT No.: PCT/KR2005/004155

§ 371 (c)(1),
(2), (4) Date: May 17, 2006

(87) PCT Pub. No.: WO2006/078090

PCT Pub. Date: Jul. 27, 2006

(65) Prior Publication Data

US 2008/0007067 A1      Jan. 10, 2008

(30) Foreign Application Priority Data

Jan. 19, 2005   (KR)   ............... 10-2005-0005062
Nov. 25, 2005   (KR)   ............... 10-2005-0113293

(51) Int. Cl.
  *F03D 3/02*       (2006.01)
(52) U.S. Cl. ............... 416/111; 416/132 A; 416/132 B; 416/196 A
(58) Field of Classification Search ................. 415/4.2, 415/4.4, 907; 416/110, 111, 119, 132 A, 416/132 B, 196 A, 197 A, 230, 244 R
See application file for complete search history.

(56) References Cited

U.S. PATENT DOCUMENTS 1,478 A * 1/1840 Southworth ................. 416/119

(Continued)

FOREIGN PATENT DOCUMENTS

GB        2067670 A  *  7/1981

(Continued)

*Primary Examiner*—Edward Look
*Assistant Examiner*—Aaron R Eastman
(74) *Attorney, Agent, or Firm*—Arent Fox LLP

(57) ABSTRACT

Disclosed herein is a wind turbine. The wind turbine includes a support unit having a lower base block and a cylindrical protruding part. A rotary cylinder is rotatably supported by the protruding part. A rotating shaft extends from a center of the rotary cylinder to rotate along therewith. An upper bearing is installed on the protruding part to support the rotary cylinder. A lower bearing is installed on the lower base block to support the rotary cylinder. A plurality of vanes is installed along the outer circumference of the rotary cylinder at regular angular intervals, and is opened outwards relative to the rotary cylinder or closed to be in close contact with the outer circumference of the rotary cylinder, according to a position relative to a wind direction. An angle limiting means prevents each vane from being opened beyond a preset angle.

4 Claims, 11 Drawing Sheets

U.S. PATENT DOCUMENTS

| | | | | |
|---|---|---|---|---|
| 4,517 A | * | 5/1846 | Hand | 416/86 |
| 82,307 A | * | 9/1868 | Goodale | 416/119 |
| 98,392 A | * | 12/1869 | Louden | 416/119 |
| 99,980 A | * | 2/1870 | Vaughn | 416/119 |
| 113,284 A | * | 4/1871 | Folsom | 416/119 |
| 260,085 A | * | 6/1882 | Coloney | 416/118 |
| 302,769 A | * | 7/1884 | Pallausch | 416/119 |
| 840,208 A | * | 1/1907 | Hartong | 416/50 |
| 893,790 A | * | 7/1908 | Fontaine | 416/119 |
| 1,139,103 A | * | 5/1915 | Clade | 416/119 |
| 1,248,305 A | * | 11/1917 | Gallagher | 415/149.1 |
| 3,371,718 A | * | 3/1968 | Bacon | 416/22 |
| 3,743,848 A | * | 7/1973 | Strickland | 290/55 |
| 3,938,907 A | * | 2/1976 | Magoveny et al. | 415/141 |
| 3,995,170 A | * | 11/1976 | Graybill | 290/55 |
| 4,004,861 A | * | 1/1977 | Soules | 416/41 |
| 4,048,947 A | * | 9/1977 | Sicard | 440/8 |
| 4,057,270 A | * | 11/1977 | Lebost | 290/54 |
| 4,095,422 A | * | 6/1978 | Kurakake | 60/398 |
| 4,218,183 A | * | 8/1980 | Dall-Winther | 416/41 |
| 4,424,451 A | * | 1/1984 | Schmidt | 290/54 |
| 4,457,669 A | * | 7/1984 | Corry | 416/119 |
| 4,468,169 A | * | 8/1984 | Williams | 416/119 |
| 4,545,729 A | * | 10/1985 | Storm | 416/132 B |
| 4,618,312 A | * | 10/1986 | Williams | 416/119 |
| 5,051,059 A | * | 9/1991 | Rademacher | 415/7 |
| 5,098,264 A | * | 3/1992 | Lew | 418/23 |
| 6,242,818 B1 | * | 6/2001 | Smedley | 290/44 |
| 6,417,578 B1 | * | 7/2002 | Chapman et al. | 290/44 |
| 6,448,668 B1 | * | 9/2002 | Robitaille | 290/54 |
| 6,499,939 B2 | * | 12/2002 | Downing | 415/3.1 |
| 6,749,394 B2 | * | 6/2004 | Boatner | 415/4.2 |
| 6,870,280 B2 | * | 3/2005 | Pechler | 290/55 |
| 2004/0001752 A1 | * | 1/2004 | Noble | 416/1 |
| 2004/0057830 A1 | * | 3/2004 | Boatner | 416/61 |
| 2005/0263057 A1 | * | 12/2005 | Green | 114/102.1 |

FOREIGN PATENT DOCUMENTS

| | | |
|---|---|---|
| JP | 2003-106249 A | 4/2003 |
| JP | 2004-353637 A | 12/2004 |
| KR | 10-1983-00008035 A | 11/1983 |

\* cited by examiner

WIND TURBINE

TECHNICAL FIELD

The present invention relates, in general, to wind turbines and, more particularly, to a wind turbine which reduces rotational resistance due to vanes that are provided on a rotary cylinder to provide rotating force to the rotary cylinder, thus achieving high power generation efficiency.

BACKGROUND ART

Generally, as the world's industries have developed and the population has swelled, resources, such as petroleum, coal, or natural gas, have been drained. Thus, much research on wind turbines, which generate power using wind force, have been conducted as an alternative energy source.

Meanwhile, a horizontal-type wind turbine, which has been widely used, is constructed so that a rotor having a plurality of vanes is provided on the upper end of a structure which is vertically erected on the ground. Such a horizontal-type wind turbine is operated as follows. That is, the rotor is rotated by wind force, and mechanical energy generated by the rotation of the rotor is transmitted to a power generator and converted into electrical energy, thus generating power.

However, in order to maintain stable power generating conditions, the rotor of the horizontal-type wind turbine must be positioned at a high level where a steady airflow exists. This causes the rotor support structure to become excessively high, thus incurring high installation costs, in addition to raising a risk of collapse. The height also causes many difficulties in maintaining and repairing the rotor, the power generator, and other components. Further, in view of the construction of the rotor, it is possible to generate power only when minimum wind velocity is 5-6 m/sec or more. Since the direction of the rotor must be manually adjusted according to wind direction, satisfactory power generation efficiency may not be expected in a place where wind is relatively weak and the direction of the wind frequently changes. Moreover, the wind turbine must stop operating so as to prevent components from being damaged in the event of a typhoon or gusting winds.

In order to solve these problems, an improved wind turbine is disclosed in Korean Patent Appln. No. 2004-0075991, which was filed by the applicant of the present invention. FIGS. 1 and 2 show the wind turbine. Referring to FIGS. 1 and 2, the wind turbine includes a rotary cylinder 20 installed to surround a support shaft 10. A plurality of wind vanes 30 is provided on the outer circumference of the rotary cylinder 20. Each of the wind vanes 30 is provided with a lattice comprising A plurality of horizontal and vertical bars. Rotating direction-adjusting blades 31 are provided on a surface of each wind vane 30 so as to open or close a predetermined number of holes of the lattices. In this case, when the lattice holes of wind vanes 30 provided to one side relative to the rotary cylinder 20 are closed by the rotation direction-adjusting vanes 31 and are subject to wind force, the lattice holes of wind vanes 30' positioned at an opposite side are opened. However, this is problematic in that air resistance is generated due to the vertical and horizontal bars defining the lattices, so that a loss of energy is caused.

DISCLOSURE

[Technical Problem]

Accordingly, the present invention has been made keeping in mind the above problems occurring in the prior art, and an object of the present invention is to provide a wind turbine having improved vanes, thus reducing rotational resistance caused by the vanes, therefore increasing power generation efficiency of the wind turbine.

Another object of the present invention is to provide a wind turbine which will not be damaged or broken by a typhoon or gusting winds, thus being capable of utilizing strong winds, therefore achieving high power generation efficiency.

[Technical Solution]

In order to accomplish the objects, the present invention provides a wind turbine for generating power using wind force, including a support unit having a lower base block mounted to a ground and a cylindrical protruding part extending upwards from an upper surface of the lower base block; a rotary cylinder surrounding the protruding part and rotatably supported by the protruding part; a rotating shaft vertically extending from a center of the rotary cylinder and installed in the rotary cylinder to rotate along with the rotary cylinder, thus transmitting mechanical energy produced by rotation of the rotary cylinder to a power generator; an upper bearing installed between the rotary cylinder and the protruding part and supporting rotation of the rotary cylinder; a lower bearing installed between the rotary cylinder and the lower base block, and supporting a lower portion of the rotary cylinder; a plurality of vanes installed along an outer circumference of the rotary cylinder at regular angular intervals, the vanes being opened outwards relative to the rotary cylinder or closed to be in close contact with the outer circumference of the rotary cylinder, according to a position relative to a wind direction; and an angle limiting means to prevent each of the vanes from being opened beyond a preset angle.

Hereinafter, the preferred embodiments of the present invention will be described in detail with reference to the accompanying drawings. For clarity of description of the present invention, the detailed description of known functions and constructions will be omitted.

FIGS. 3 to 5 show a wind turbine, according to the first embodiment of the present invention. Referring to FIGS. 3 to 5, the wind turbine, according to the first embodiment, includes a support unit 110, a rotary cylinder 120, a rotating shaft 130, an upper bearing 140, a lower bearing 150, a plurality of vanes 160, and an angle limiting means 170. Such a wind turbine is constructed so that the vanes 160 are opened outwards relative to the rotary cylinder 120 or are in close contact with the outer circumferential surface of the rotary cylinder 120, according to the position relative to a wind.

The support unit 110 is supported on the ground so as to support the rotation of the rotary cylinder 120, and includes a lower base block 111 and a protruding part 112. The lower base block 111 is supported on the ground to support components constituting the wind turbine. The protruding part 112 protrudes upwards from the upper surface of the lower base block 111, and has the shape of a cylinder, which is hollow therein.

The rotary cylinder 120 is supported by the protruding part 112 and rotated by the wind. The rotary cylinder has a cylindrical shape to surround the protruding part 112, and is mounted to the protruding part 112. Thus, the rotary cylinder 120 is rotatable about the protruding part 112.

The rotating shaft 130 functions to transmit mechanical energy generated during the rotation of the rotary cylinder 120 to a power generator 180. The rotating shaft 130 vertically extends from the center of the rotary cylinder 120, and is coupled to the rotary cylinder 120 to be rotated along with the rotary cylinder 120. Such a rotating shaft 130 is constructed so that a lower end thereof extends into or passes through the lower base block 111. A pair of gears 181 and 182 is provided on the lower end of the rotating shaft 130 to increase the rotating speed, prior to transmitting mechanical energy to the power generator 180. In the drawings, reference numeral 190 denotes a storage battery.

The upper bearing 140 is positioned between the rotary cylinder 120 and the protruding part. 112 so as to support the rotation of the rotary cylinder 120. The upper bearing 140 is mounted to the protruding part 112.

The lower bearing 150, which functions to support the lower portion of the rotary cylinder 120, is mounted to the lower base block 111.

FIGS. 6 to 8 are detailed views of the vanes 160. Referring to FIGS. 6 to 8, the vanes 160 are subject to wind force, thus providing force for rotating the rotary cylinder 120. The plurality of vanes 160 are installed on the outer circumference of the rotary cylinder 120 at regular angular intervals, and are constructed to be opened or closed, according to the position relative to a wind direction. In a detailed description, each vane 160 is constructed so that cloth 162 or artificial leather is installed in a frame 161 which is secured at four sides thereof to have a rectangular shape. In this case, the frame 161 has a rectangular shape, and has a plane structure which is bendable to have a curvature corresponding to the radius of the rotary cylinder 120. One side of the frame 161 is rotatably hinged to the rotary cylinder 120 in such a way as to be opened or closed. When a concave surface 160a of each vane 160 is positioned in a direction facing the wind, the vane 160 is opened. Meanwhile, when a convex surface 160b of each vane 160 is positioned in a direction facing the wind, the vane 160 is closed.

The angle limiting means 170 prevents each vane 160 from being opened beyond a preset angle. The angle limiting means 170 couple the rotary cylinder 120 to the other side of each vane 160, that is, the side of each vane 160 that is not hinged to the rotary cylinder 120, thus preventing the vane 160 from being opened beyond a preset angle. Such an angle limiting means 170 may comprise a spring or rope. Preferably, the angle limiting means 170 comprises a rope made of aramid fiber. As such, if the rope is made of aramid fiber, it is light in weight and in addition bears a high load.

The operation of the wind turbine constructed as described above will be described below.

Assuming that a wind blows in the direction shown in FIG. 6, the vanes 160, which are located to the right side of the drawing and have concave surfaces 160a in a direction facing the wind, rotate to protrude outwards relative to the rotary cylinder 120 and are thereby opened. The opened vanes are subject to wind force, thus providing force for rotating the rotary cylinder 120. At this time, each vane 160 is constrained to the rotary cylinder 120 by the rope, so that it is not opened beyond a predetermined angle.

Conversely, the vanes 160 that are located to the left side of the drawing and have convex surfaces 160b in a direction facing the wind, are closed to come into close contact with the outer circumferential surface of the rotary cylinder 120. Thereby, resistance which hinders the rotation of the rotary cylinder 120 is not generated.

As such, only the vanes 160 which face the wind and are subject to wind force are opened, thus preventing rotational resistance from increasing due to the opening of unnecessary vanes 160.

FIGS. 9 and 10 show a wind turbine, according to the second embodiment of the present invention. Referring to FIGS. 9 and 10, the wind turbine according to the second embodiment includes a support unit 110, a rotary cylinder 210, a rotating shaft 130, an upper bearing 140 (FIG. 4), a lower bearing 150 (FIG. 4), a plurality of vanes 220, and support cloth 230. Since the support unit 110, the rotating shaft 130, the upper bearing 140 (FIG. 4), and the lower bearing 150 (FIG. 4) of the second embodiment are identical with those of the first embodiment, they will not be described in detail and carry the same reference numerals.

The rotary cylinder 210 may have a cylindrical structure which surrounds protruding parts 112 of the support unit 110, like the first embodiment of this invention. However, according to this embodiment, the rotary cylinder 210 has a shape similar to that of a hourglass-shaped drum so as to sufficiently use the structural characteristics of the vanes 220. That is, the rotary cylinder 210 includes a cylindrical part 211 having a constant diameter, and enlarged parts 212 and 213 which extend from opposite ends of the cylindrical part 211 such that their diameters are increased outwards.

The vanes 220 are installed on the outer circumference of the rotary cylinder 210 at regular angular intervals. One side 220a, an upper side 220b, and a lower side 220c of each vane 220 are secured to the rotary cylinder 210 by a fastening means 240. A remaining side 220d, which is opposite side 220a secured to the rotary cylinder 210, comprises a free end 240 which is not secured to the rotary cylinder 210, and comprises cloth which is longer than that of side 220a. In other words, each vane 220 is secured to the outer circumferential surface of the rotary cylinder 210, and is shaped such that part of the cloth is opened, like a pocket, to be subject to wind. In this case, one side 220a of the cloth is secured to the cylindrical part 211 of the rotary cylinder 210, and the upper and lower sides 220b and 220c of the cloth are secured to the enlarged parts 212 and 213.

FIG. 11 shows the construction of the fastening means 240. Referring to FIG. 11, the fastening means 240 includes a fastening groove 241, a fastening bar 242, and a plurality of bolts 243. The fastening groove 241 is provided along surfaces of the cylindrical part 211 and the enlarged parts 212 and 213 in such a way as to extend in a lengthwise direction of the rotary cylinder 210. Preferably, the fastening groove 241 has a circular cross-section. After respective sides 220a, 220b, and 220c of each vane 220 are inserted into the fastening groove 241, the fastening bar 242 is inserted into the fastening groove 241 so that the vane 220 is secured to the rotary cylinder 210. After the fastening bar 242 is inserted into the fastening groove 241, the bolts 243 pass through the fastening bar 242 to be fastened thereto, thus preventing the fastening bar 242 from being removed from the fastening groove 241.

The support cloth 230 supports each vane 220 such that the central portion of the vane 220 expands within a predetermined distance from the rotary cylinder 210. The support cloth 230 couples the central portion of the side 220d, positioned at the open end of the cloth, to the rotary cylinder 210.

When the vanes 220 of the second embodiment constructed as described above are located such that the open ends of the vanes 220 face a wind, the wind blows into the vanes 220, so that the vanes 220 are expanded. Thereby, force for rotating the rotary cylinder 210 is generated. At this time, other vanes 220 provided at an opposite position relative to the rotary cylinder 210 do not face the wind, thus maintaining a contracted state. Therefore, they do not produce resistance which prevents the rotary cylinder 210 from rotating.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

[Advantageous Effects]

As described above, the present invention opens or closes vanes according to the position of the vanes relative to a wind direction, thus minimizing rotational resistance caused by vanes that do not generate rotating force, therefore allowing power generation to be smoothly carried out even in a region where wind is weak. Further, the present invention provides a wind turbine which is inexpensive, permits easy maintenance, and relatively stably generates power in the event of a typhoon or gusting winds.

DESCRIPTION OF REFERENCE CHARACTERS OF IMPORTANT PARTS

Figure 1:
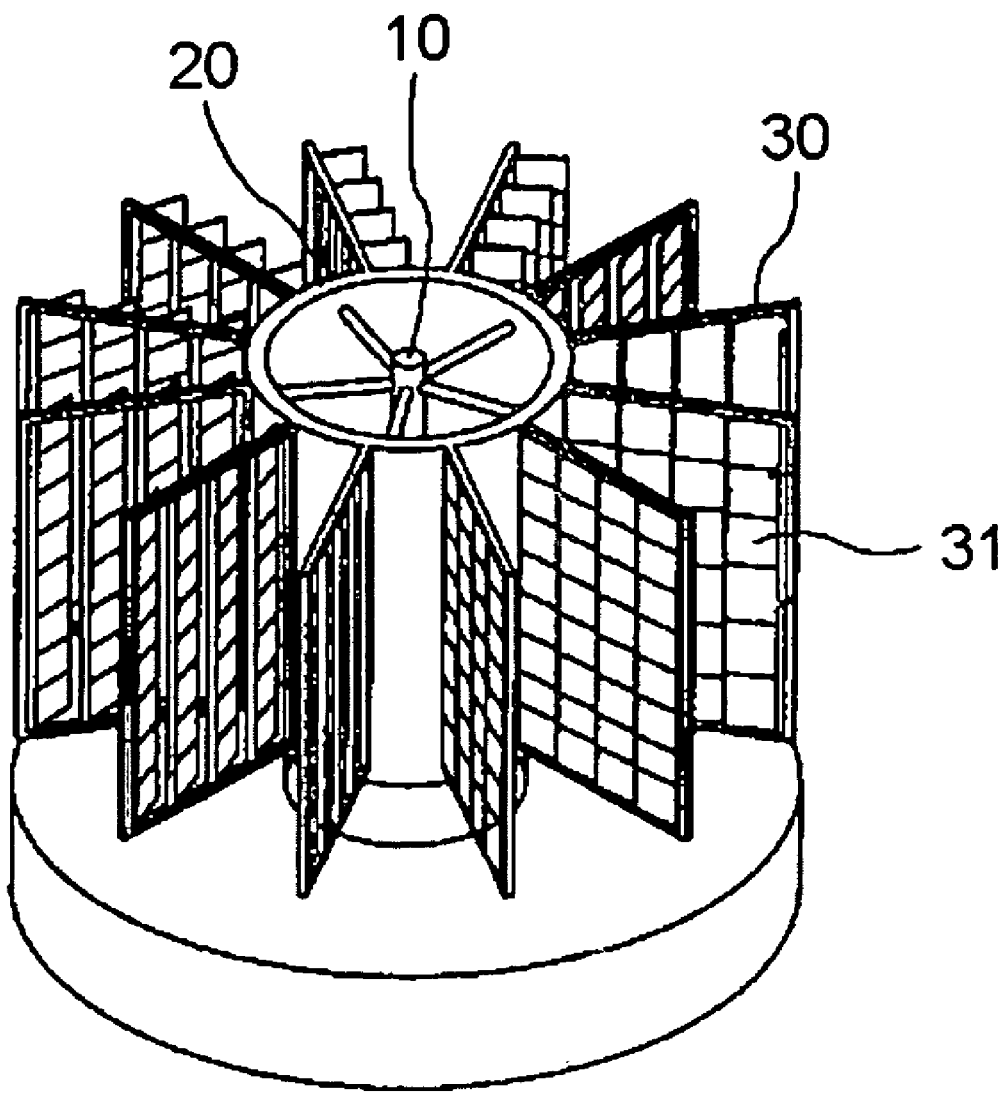
FIG. 1 is a perspective view showing a conventional wind turbine.
Figure 2:
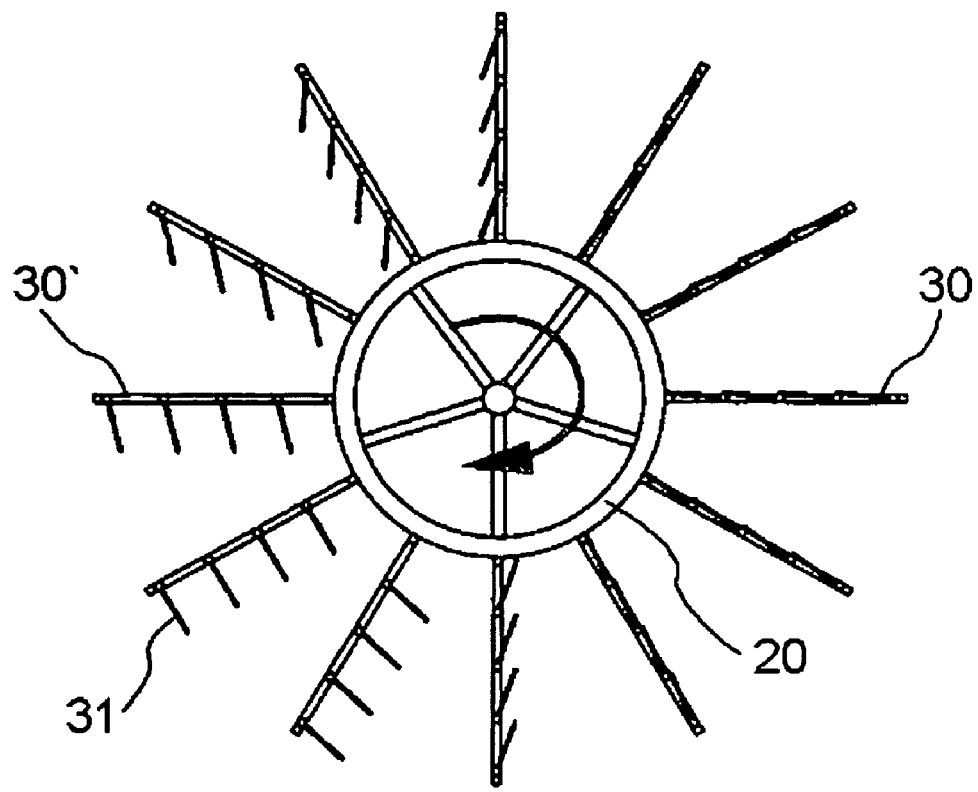
FIG. 2 is a plan view of FIG. 1.
Figure 3:
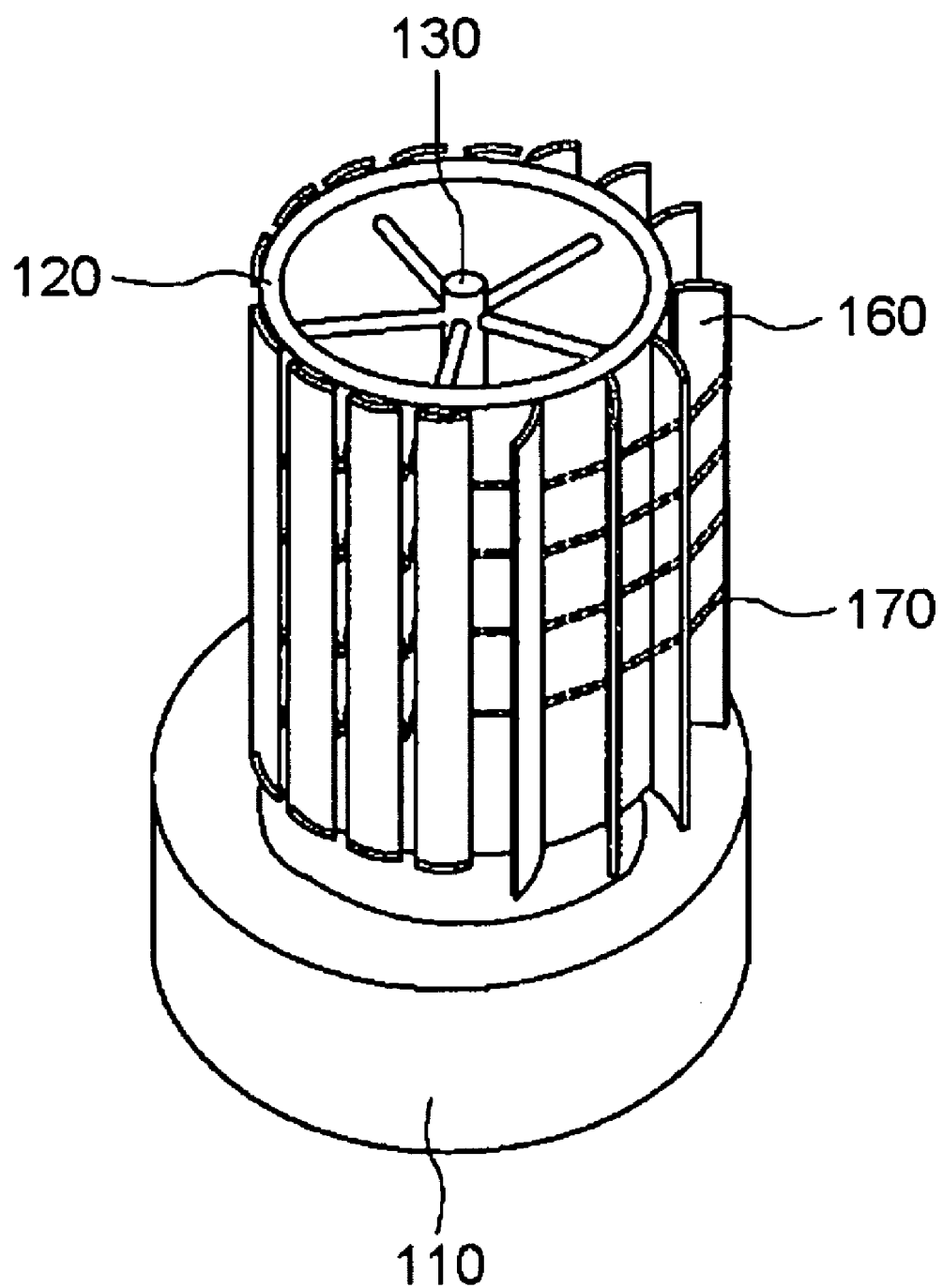
FIG. 3 is a perspective view of a wind turbine, according to the first embodiment of the present invention.
Figure 4:
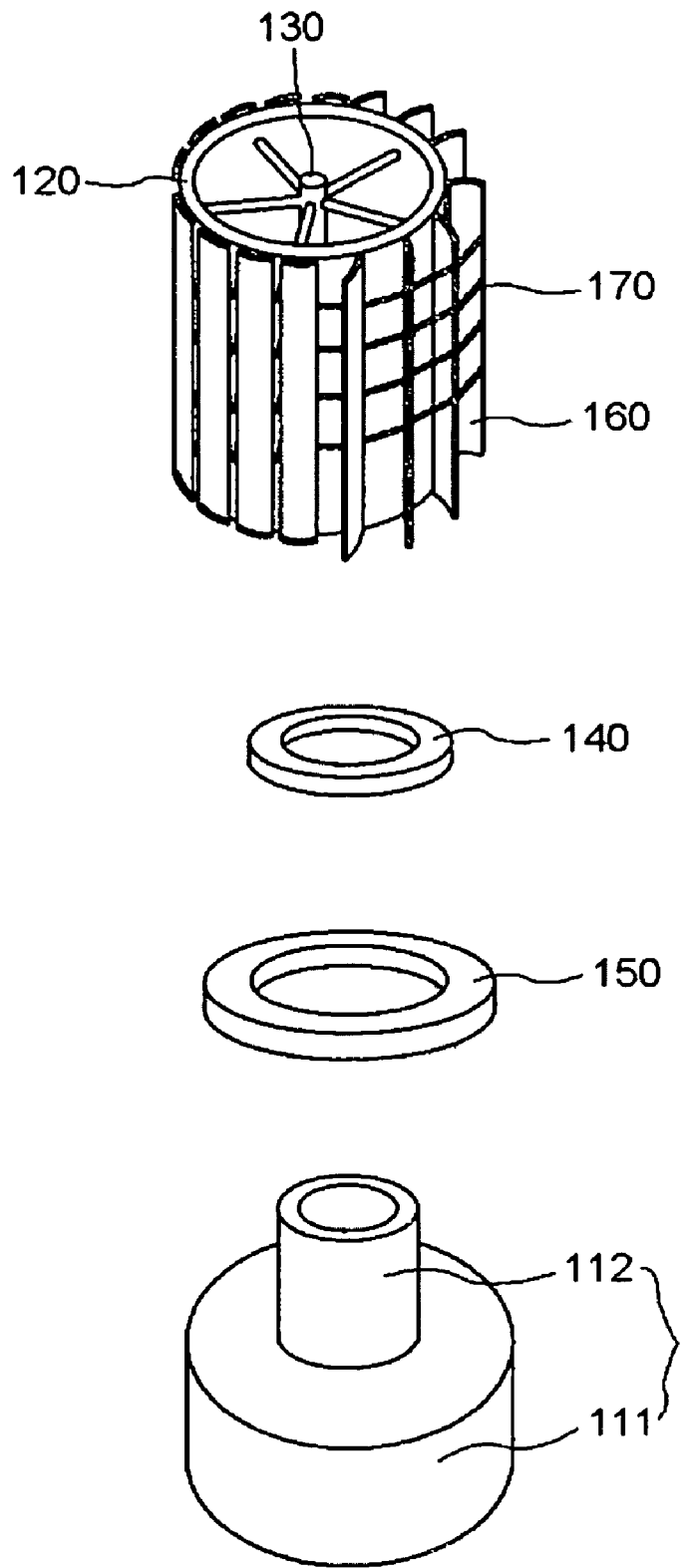
FIG. 4 is an exploded perspective view of FIG. 3.
Figure 5:
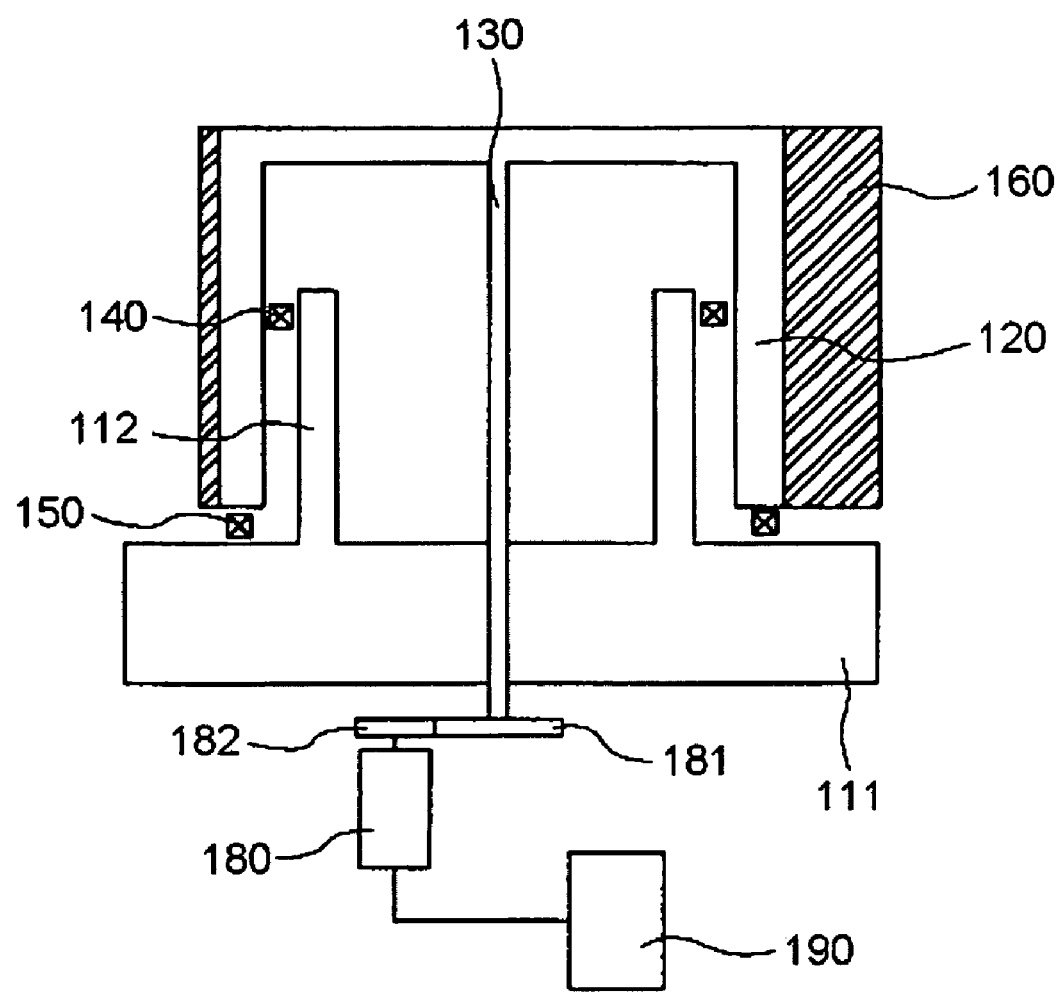
FIG. 5 is a sectional view of the wind turbine shown in FIG. 3.
Figure 6:
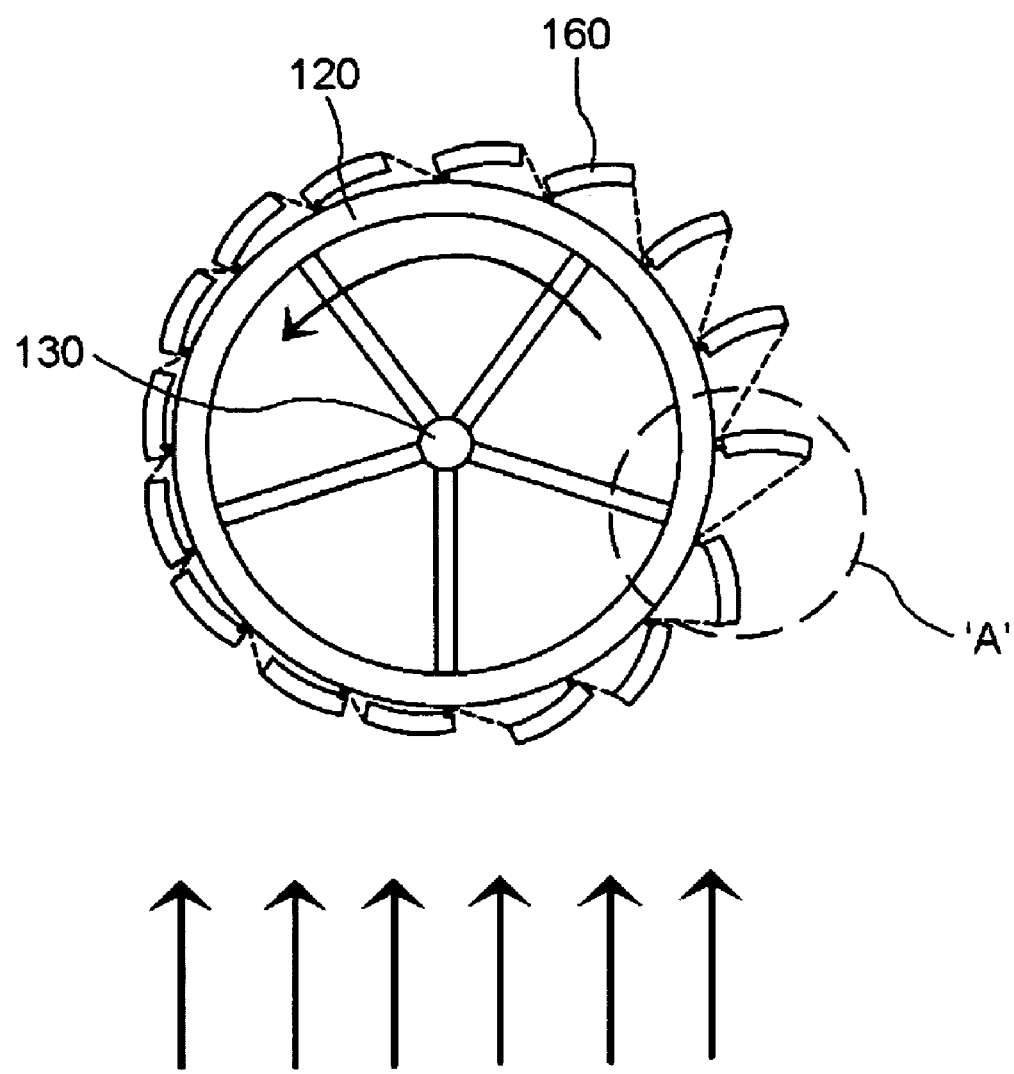
FIG. 6 is a plan view of FIG. 3.
Figure 7:
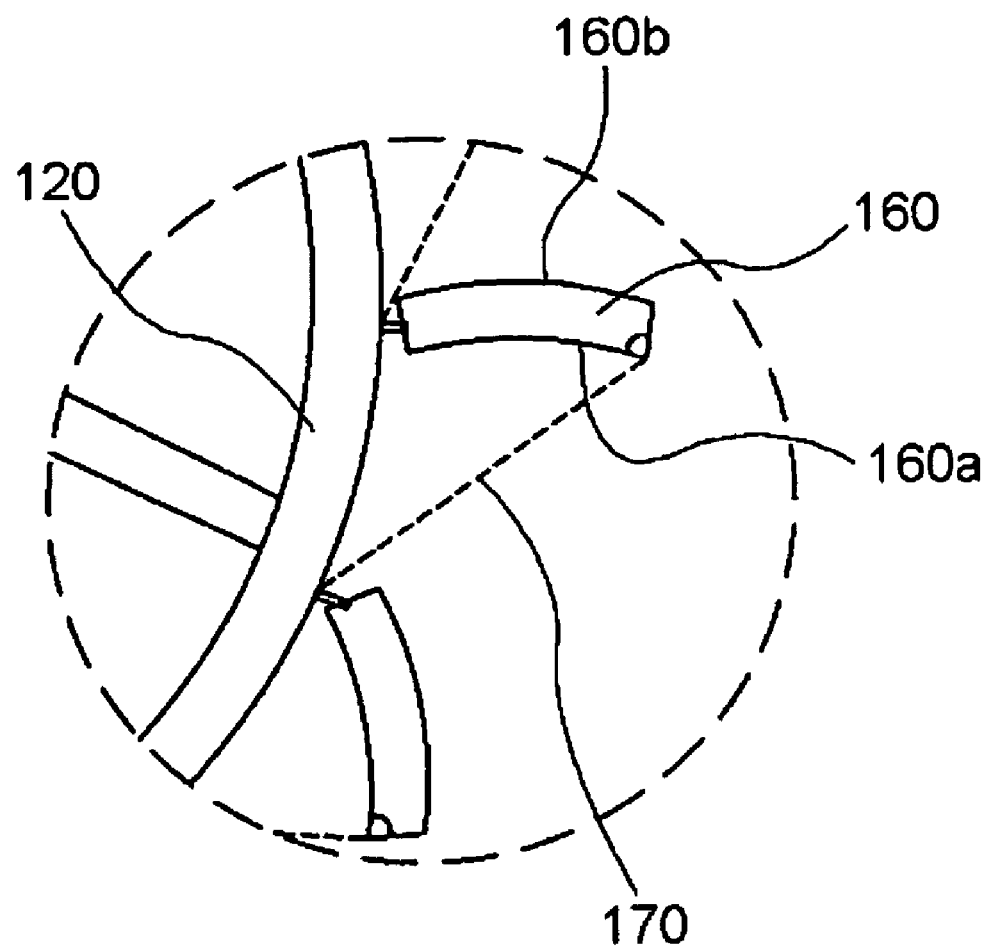
FIG. 7 is a detailed view of portion 'A' of FIG. 3.
Figure 8:
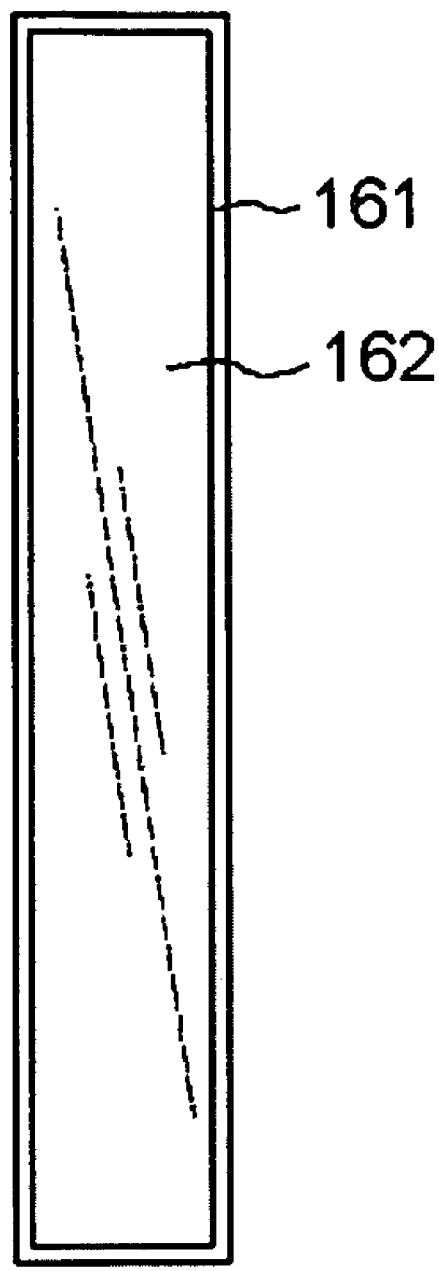
FIG. 8 is a front view of a vane shown in FIG. 1.
Figure 9:
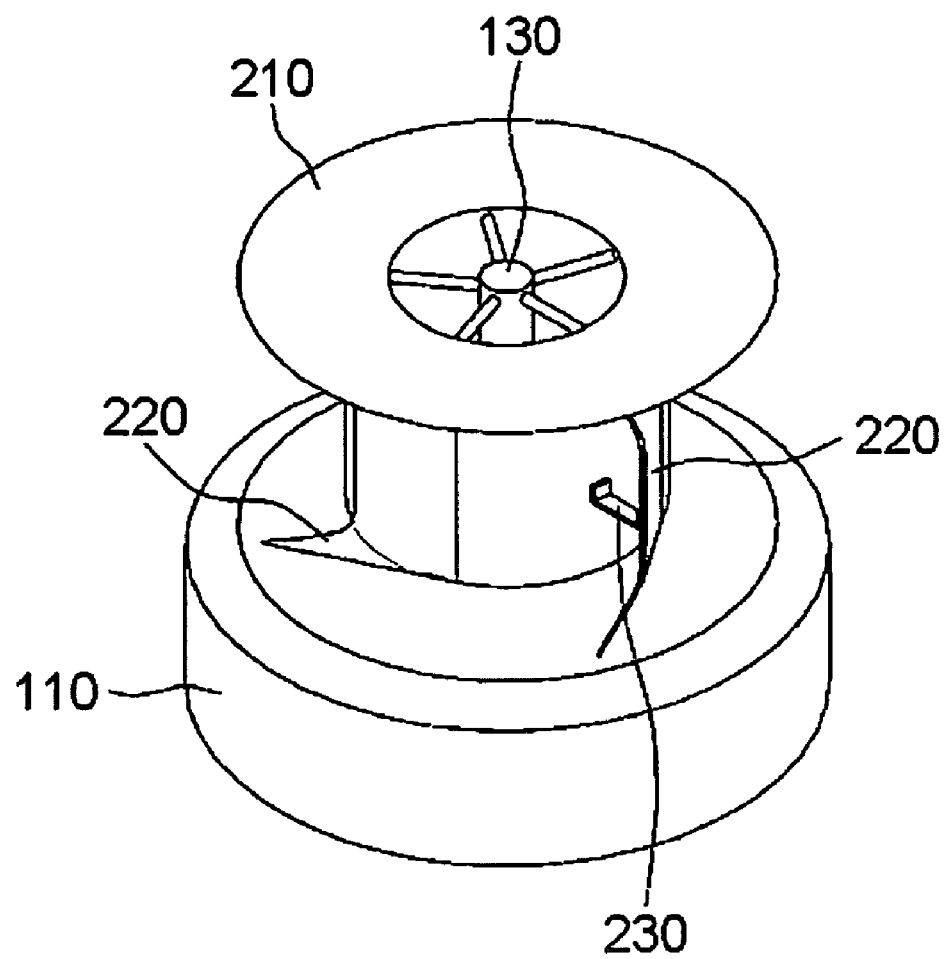
FIG. 9 is a perspective view of a wind turbine, according to the second embodiment of the present invention.
Figure 10:
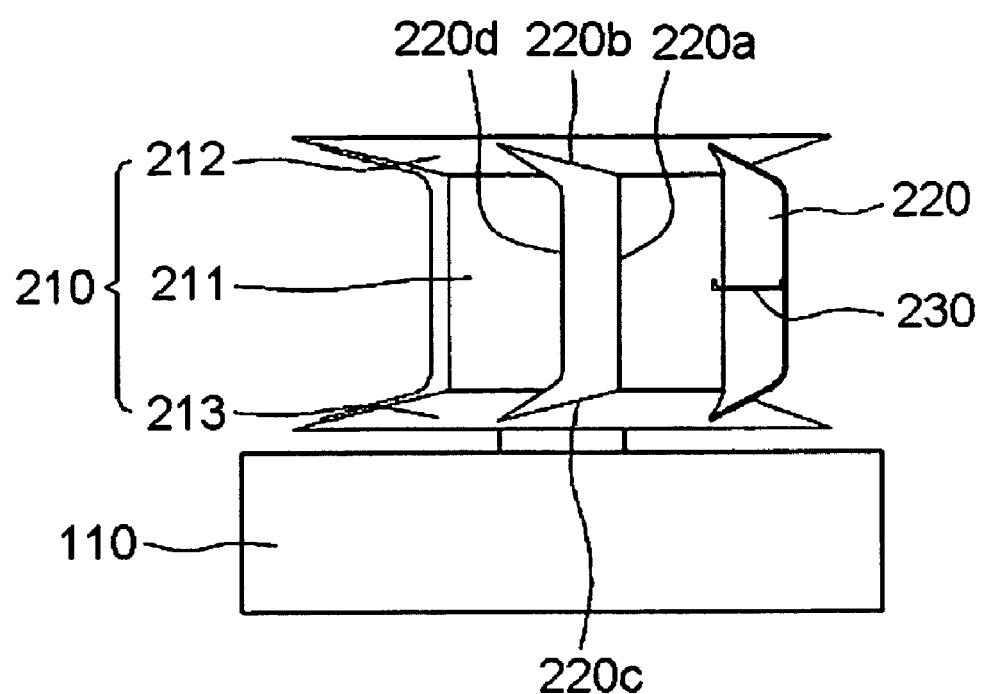
FIG. 10 is a side view of FIG. 9.
Figure 11:
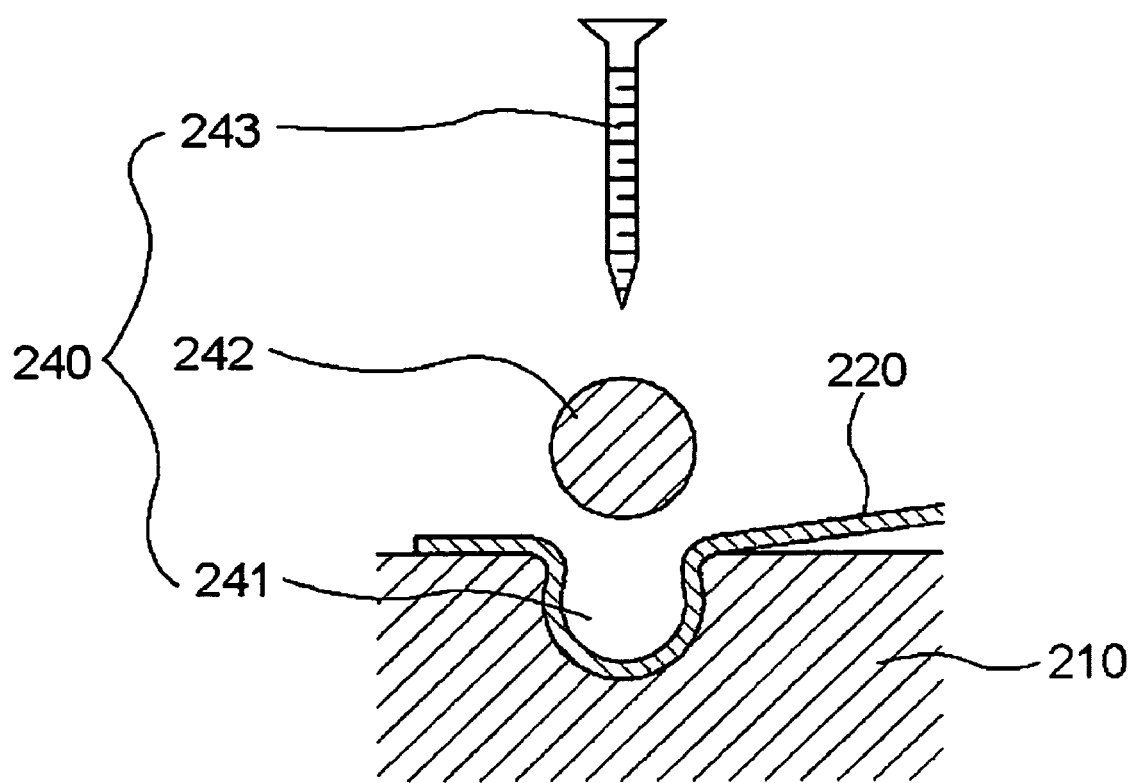
FIG. 11 is a sectional view showing the construction of a fastening means to fasten cloth of FIG. 9 to a rotary cylinder.

| | |
|---|---|
| 110: support unit | 111: lower base block |
| 112: protruding part | 120: rotary cylinder |
| 130: rotating shaft | 140: upper bearing |
| 150: lower bearing | 160: vanes |
| 161: frame | 162: cloth |
| 170: angle limiting means | 180: power generator |
| 190: storage battery | 210: rotary cylinder |
| 211: cylindrical part | 212, 213: enlarged parts |
| 220: vanes | 230: support cloth |
| 240: fastening means | 241: fastening groove |
| 242: fastening bar | 243: bolts |

The invention claimed is:

1. A wind turbine for generating power using wind force, comprising:
    a support unit, comprising a lower base block mounted to a ground, and a cylindrical protruding part extending upwards from an upper surface of the lower base block;
    a rotary cylinder surrounding the protruding part, and rotatably supported by the protruding part;
    a rotating shaft vertically extending from a center of the rotary cylinder, and installed in the rotary cylinder to rotate along with the rotary cylinder, thus transmitting mechanical energy produced by rotation of the rotary cylinder to a power generator;
    an upper bearing installed on the protruding part to be positioned between the rotary cylinder and the protruding part, and supporting rotation of the rotary cylinder;
    a lower bearing installed on the lower base block to be positioned between the rotary cylinder and the lower base block, and supporting a lower portion of the rotary cylinder;
    a plurality of vanes installed along an outer circumference of the rotary cylinder at regular angular intervals, the vanes being opened outwards relative to the rotary cylinder or closed to be in close contact with the outer circumference of the rotary cylinder, according to a position relative to a wind direction, wherein each of the vanes comprises cloth, the cloth being fastened at a first side, an upper side, and a lower side thereof to the rotary cylinder via fastening means, and a second side of the cloth opposite the first side thereof comprises an open end and is longer than the first side, so that, when the open end is positioned in a direction facing a wind, the cloth is expanded and rotates the rotary cylinder by wind force, and, when the open end is positioned in a direction which does not face the wind, the cloth is contracted and reduces rotational resistance of the rotary cylinder; and
    angle limiting means to prevent each of the vanes from being opened beyond a preset angle, wherein the rotary cylinder includes a cylindrical part having a constant diameter, and providing space for securing the first side of each of the vanes, and
    enlarged parts provided on opposite ends of the cylindrical part, and extending from the opposite ends of the cylindrical part such that their diameters are increased outwards, the enlarged parts providing space for securing the upper side and the lower side of each of the vanes.

2. The wind turbine according to claim 1, wherein each of the vanes comprises:
    a frame having a rectangular shape, and having a plane structure which is bendable to have a curvature radius corresponding to a radius of the rotary cylinder, a first side of the frame being hinged to the rotary cylinder so that the frame is closed to be in close contact with the outer circumference of the rotary cylinder or is opened to protrude outwards relative to the rotary cylinder; and
    cloth or artificial leather installed in the frame to cover an interior of the frame.

3. The wind turbine according to claim 1, wherein the angle limiting means comprises a rope which is made of fiber and couples the rotary cylinder to a second side of each of the vanes.

4. The wind turbine according to claim 1, wherein the second side of each of the vanes is fastened to the rotary cylinder via support cloth so that a center of the second side of each of the vanes is expanded within a predetermined distance range from the rotary cylinder.

* * * * *